(12) United States Patent
Aono

(10) Patent No.: US 7,949,902 B2
(45) Date of Patent: May 24, 2011

(54) FAILURE ANALYSIS SYSTEM, A DISK ARRAY APPARATUS, A CONTROLLER, A METHOD FOR ANALYZING FAILURE, AND A SIGNAL-BEARING MEDIUM EMBODYING A PROGRAM CAUSING A FAILURE ANALYSIS SYSTEM TO PERFORM THE METHOD

(75) Inventor: Masaaki Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 505 days.

(21) Appl. No.: 11/378,298

(22) Filed: Mar. 20, 2006

(65) Prior Publication Data

US 2006/0224734 A1 Oct. 5, 2006

(30) Foreign Application Priority Data

Mar. 30, 2005 (JP) .................................. 2005-099769

(51) Int. Cl.
*G06F 11/00* (2006.01)
(52) U.S. Cl. ........................................................ 714/43
(58) Field of Classification Search ...................... 714/43
See application file for complete search history.

(56) References Cited

U.S. PATENT DOCUMENTS

2004/0042408 A1* 3/2004 Sakai ............................ 370/241

FOREIGN PATENT DOCUMENTS

| JP | 09-069030 | 3/1997 |
|---|---|---|
| JP | 2001-216206 | 8/2001 |
| JP | 2002-007077 | 1/2002 |
| JP | 2003-196036 | 7/2003 |
| JP | 2004-94774 | 3/2004 |
| JP | 2004-094774 | 3/2004 |
| JP | 2004-199551 | 7/2004 |

* cited by examiner

*Primary Examiner* — Scott T Baderman
*Assistant Examiner* — Jigar Patel
(74) *Attorney, Agent, or Firm* — McGinn IP Law Group, PLLC

(57) ABSTRACT

A failure analysis system includes a controller A that sends a control command A, a looped interface A, the controller A being selectively connectable to the looped interface A, a node device A that is selectively connectable to the looped interface A, a node device B that is selectively connectable to the looped interface A, and an enclosure service device A that receives the control command A via the node device A. If a failure occurs, the enclosure service device A disconnects the node device B from the looped interface A, and one of: maintains the node device A connected to the looped interface A, and disconnects and subsequently re-connects the node device A to the looped interface A.

21 Claims, 9 Drawing Sheets

FAILURE ANALYSIS SYSTEM, A DISK ARRAY APPARATUS, A CONTROLLER, A METHOD FOR ANALYZING FAILURE, AND A SIGNAL-BEARING MEDIUM EMBODYING A PROGRAM CAUSING A FAILURE ANALYSIS SYSTEM TO PERFORM THE METHOD

BACKGROUND OF THE INVENTION

1. Technical Field

The present invention relates generally to a failure analysis system having a looped interface. Specifically, it relates to a failure analysis system in a looped interface that includes a controller and an enclosure service unit under a node device connected to the looped interface. The enclosure service unit accepts a command from the controller via the node device.

In one exemplary embodiment, the present invention relates to a failure analysis system in a looped interface having a doubled FC-AL (Fiber-channel Arbitrated Loop) that includes an enclosure service unit loading an ESI (Enclosure Service Interface) controller SES (SCSI Enclosure Service) connected to a respective loop system so that, even though failures occur in all loop systems, a loop failure analysis may be executed.

2. Related Art

Recently, an interface which connects node devices in a loop (e.g., a Fiber Channel Arbitrated Loop (FC-AL)) has been widely used in a node device system (e.g., disk array apparatuses) and the like, since it has a simple connecting configuration of cables and can easily accommodate device extensions. However, this type of interface has a problem in that, when signals cannot propagate in the loop because of failure or the like in the interface circuits of connected devices (this is called, for example, a loop abnormality or link down), the entire loop cannot be used. For example, even though a failure occurs in only one device, all devices connected to the loop cannot be used.

For this reason, these devices may include interface circuits for two ports (duplex) so that they are connected to two independent loops. With this configuration, even when one loop of the dual loop interfaces is out of use because of a failure or the like, accesses may be performed using the other loop, to thereby improve reliability. Further, this kind of disk array apparatus may include a function of identifying a faulty device and restoring the failure when a loop abnormality occurs, by detecting which device is faulty and isolating it from the loop.

For example, JP 2004-94774 A, describes a node device system (e.g., disk array apparatus) having a double FC-AL. If failures occur in both loop systems due to one of the disk failures, an enclosure service unit controls the disconnect/reconnect state of each disk array to automatically perform a single disconnection processing for all disks. Configuration and operation of the disk array apparatus in two conventional examples will be explained with reference to FIGS. 5 though 9.

Hereinbelow, loop A components labels are discussed as "Ax" and loop B components labels are discussed as "Bx".

FIG. 5 is an exemplary block diagram showing an exemplary configuration of the conventional disk array apparatus in a normal state. For example, in this disk array apparatus, a host may directly access the enclosure service units (e.g., FC Direct Attached SES (SCSI Enclosure Service)). As shown in this figure, the disk array apparatus having a doubled FC-AL is connected, for example, plural disks 21-2N are connected to two loops A41, B42 (FC-AL A, FC-AL B), respectively, via loop connection switch units A31, B32.

In each loop system A, B, enclosure service units A51, B52 are installed respectively, being interconnected via path 130. For example, these enclosure service units A51, B52 contain loop connection control units A513, B523 that control disconnection and connection of each disk 21-2N from the loop system (FC-AL) and are connected to the aforementioned loop connection switch units A31, B32 via paths 514 and 524. In addition, in each loop system, disk control units A71, B72 generate a control command to enclosure service units A51 and B52 to perform disk control.

As shown in FIG. 6, a failure is assumed to occur in the FC-AL B loop system (one of the two loop systems) in the disk 24. In this case, since FC-AL A41 that is in the other loop system, is operated normally by disk control unit A71, from normal looped enclosure service unit A51 using path 130, it accesses looped (FC-AL B42) enclosure service unit B52 in FC-AL B loop system where the failure has occurred. Loop connection control unit B523 sequentially disconnects the disk 21-2N and uses path 524 to perform failure analysis. (See dotted arrow in FIG. 6).

Next, FIG. 7 shows an exemplary mode when a failure occurs in both loop systems in specified disk 24. As shown in this figure, if a failure occurs in both systems in disk 24 neither loop system (A, B) can be operated, so that access from disk control units 71, B72 to respective enclosure service units A51, B52 is completely disabled. Therefore, failure may not be analyzed without further treatment. For this reason, as shown in FIG. 8, in one conventional method, at this point, both loop systems A, B are then disconnected from each disk 21-2N so that disk control units A71, B72 may access the respective enclosure services units A51, B52.

As a result, each of enclosure service units A51, B52 can then sequentially connect to disk 21-2N to perform a failure analysis. In other words, if a re-connection command is sequentially given from the disk control units 71, 72 after recovering both loop systems, the disk 24 causing the loop failure may be identified so that the abnormal disk can be disconnected from the FC-AL to continue operation.

SUMMARY OF THE INVENTION

[Exemplary Problems to be Solved by the Present Invention]

The failure analysis method in the conventional cases mentioned above may be used when controller (e.g., host) directly accesses the enclosure service units (e.g., FC Direct Attached SES (SCSI Enclosure Service)). For example, since the aforementioned disk array apparatus has such a configuration that controller (e.g., host, disk control unit A71, B72) directly accesses the enclosure service units 51, 52, if all the disks are disconnected, controller (e.g., host, disk control unit A71, B72) may access each disk 21-2N via FC 41, 42 to perform failure analysis.

In contrast, in another recent disk array apparatus, as shown in FIG. 9, a configuration (e.g., an ESI (Enclosure Service Interface) controller SES) in which an enclosure service unit 51, 52 under a node device 21-2N connected to the looped interface 41, 42 accepts a command from via the node device is used.

For example, the ESI (Enclosure Service Interface) controller SES shown in FIG. 9 is used such that disk control units A71, B72 are connected to each disk 21-2N, and enclosure service units A51, B52 are connected under specific disks to accept a command via the above-mentioned disk control unit 71, 72. When this ESI controller SES in FIG. 9 is compared with FC Direct Attached SES shown in FIGS. 5-8, the FC Direct Attached SES 51, 52 directly accesses the enclosure service unit, requiring a special driver and the problem is that cost increases occur. That is, ESI controller SES is less expensive from the aspect of costs.

Since ESI controller SES is present under the disk control without SES on the FC-AL, despite any changes in the FC transferring rate, the advantage is that the conventional SES chip can be directly used. From this standpoint, there is a possibility that an apparatus using an ESI controller SES will be developed in the future.

As mentioned above, in the configuration (e.g., a ESI controller SES), when performing exemplary failure analysis in the configuration exemplarily disclosed in the aforementioned JP 2004-94774 A, as shown in FIG. 9, if all the node devices (e.g., the disks 21-2N) in the loop system (e.g., both loop A and B systems) are disconnected, for example, there may be a problem in that controller (e.g., disk control units A71, B72) cannot access enclosure service units A51, B52, resulting in the inability to perform failure analysis for disk 21-2N.

In view of the foregoing and other exemplary problems, drawbacks, and disadvantages of the conventional techniques, it is an exemplary feature of the present invention to provide a failure analysis system, a disk array apparatus, a controller, a method for analyzing failure, and a signal-bearing medium embodying a program causing an failure analysis system to perform the method, by which the controller may access enclosure service unit, in a looped interface that includes the controller and the enclosure service unit under a node device connected to the looped interface, even if a failure occur.

The present invention provides a failure analysis system that includes a controller A that sends a control command A, a looped interface A, the controller A being selectively connectable to the looped interface A, a node device A that is selectively connectable to the looped interface A, a node device B that is selectively connectable to the looped interface A, and an enclosure service device A that receives the control command A via the node device A. If a failure occurs, the enclosure service device A: disconnects the node device B from the looped interface A, and one of: maintains the node device A connected to the looped interface A, and disconnects and subsequently re-connects the node device A to the looped interface A.

The present invention also provides a disk array apparatus that includes the failure analysis system. The node device A includes a disk device. The node device B includes a disk device.

The present invention also provides a controller that includes the controller A in the failure analysis system.

The present invention also provides a method for analyzing failure in a system. The system includes a controller A that sends a control command A, a looped interface A, the controller A being selectively connectable to the looped interface A, a node device A that is selectively connectable to the looped interface A, a node device B that is selectively connectable to the looped interface A, an enclosure service device A that receives the control command A via the node device A. The method includes, if a failure occurs, disconnecting the node device B from the looped interface A, and one of maintaining the node device A connected to the looped interface A, and disconnecting and subsequently re-connecting the node device A to the looped interface A.

The present invention also provides a signal-bearing medium embodying a program of machine-readable instructions executable by a digital processing apparatus, the program causing a failure analysis system to perform the method above.

[Exemplary Advantage of the Invention]

One exemplary advantage of the present invention is that the controller may access the enclosure service unit, in a looped interface that includes the controller and the enclosure service unit under a node device connected to the looped interface, even if a failure occurs. This may be because a failure analysis system may include a controller A that sends a control command A, a looped interface A, the controller A being selectively connectable to the looped interface A, a node device A that is selectively connectable to the looped interface A, a node device B that is selectively connectable to the looped interface A, and an enclosure service device A that receives the control command A via the node device A, wherein, if a failure occurs, the enclosure service device A: disconnects the node device B from the looped interface A, and one of: maintains the node device A connected to the looped interface A, and disconnects and subsequently re-connects the node device A to the looped interface A.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

In the present invention, a controller (e.g., ESI controller SES (enclosure service unit)) may be connected under respective different node devices so that if failures occur in all loop systems, a node device (e.g., plural node devices) may be allocated such that each SES (enclosure service unit) contains a connected node device to disconnect other disks, for example. As a result, one of the loop systems may be recovered and failure analysis can then be performed using the SES in the corresponding recovered loop system.

In the following examples, a disk array apparatus wherein plural FC-AL disks are connected to a doubled looped interface is explained as an example of the present invention.

However, this invention is not limited by the fact that the looped interface is doubled. It may be single or further multiplexed. The devices that are connected to the looped interface may not be limited to be disks, and failure analysis may be performed using a system where other node devices are connected.

Figure 1:
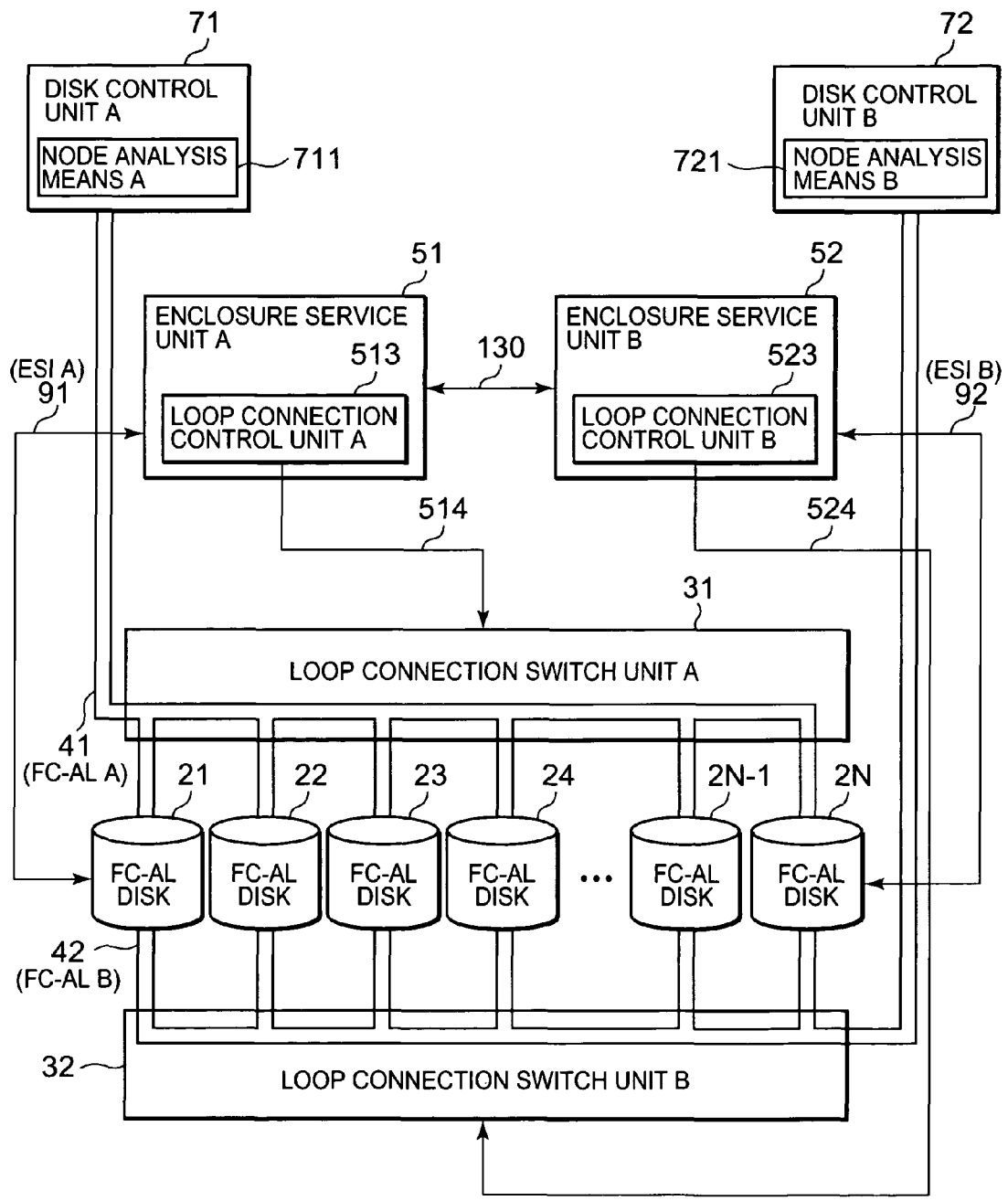
FIG. 1 shows an exemplary block diagram showing an exemplary configuration of the present invention.
Figure 2:
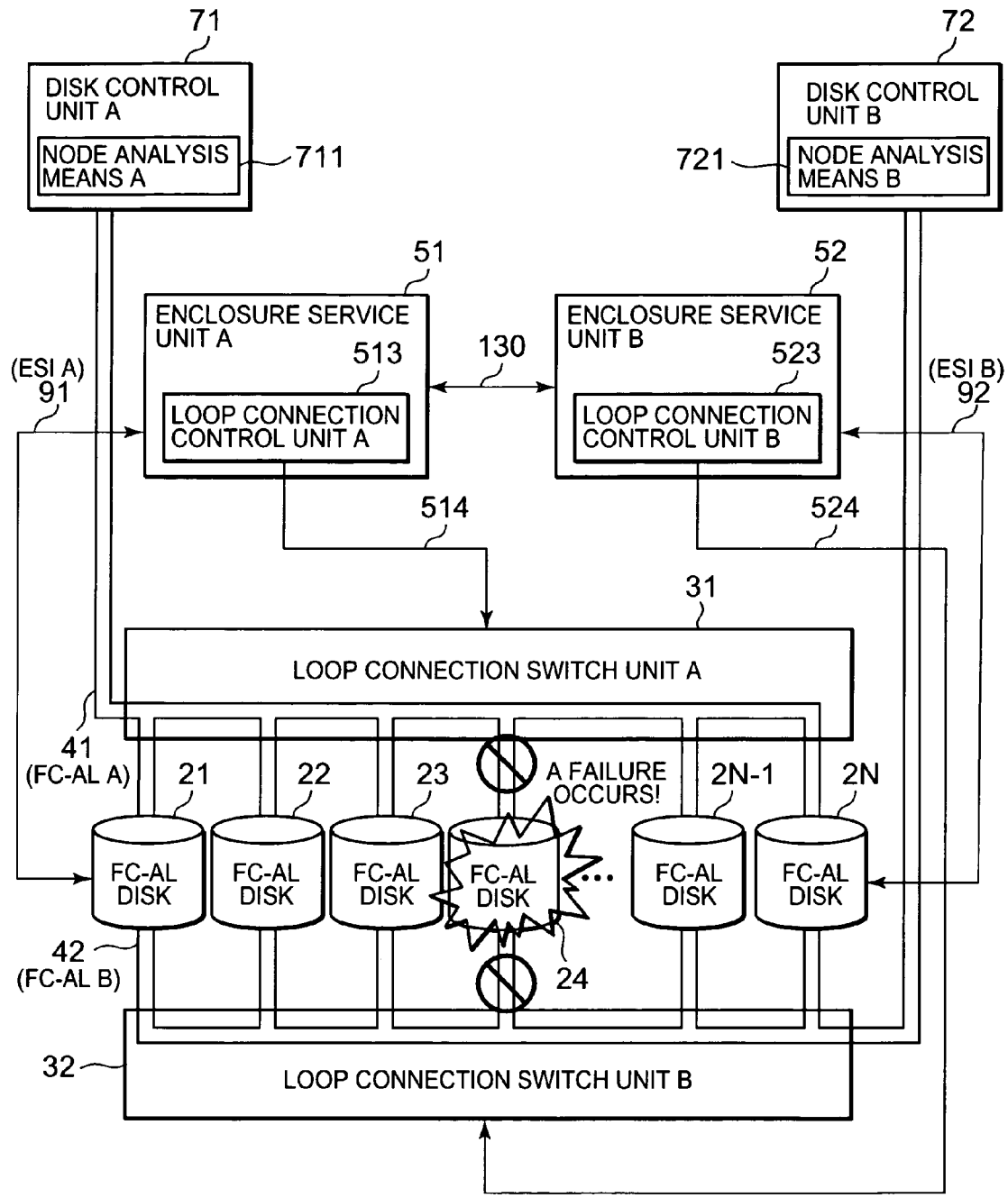
FIG. 2 shows an exemplary explanatory diagram showing an exemplary mode at the time of occurrence of exemplary failures.
Figure 3:
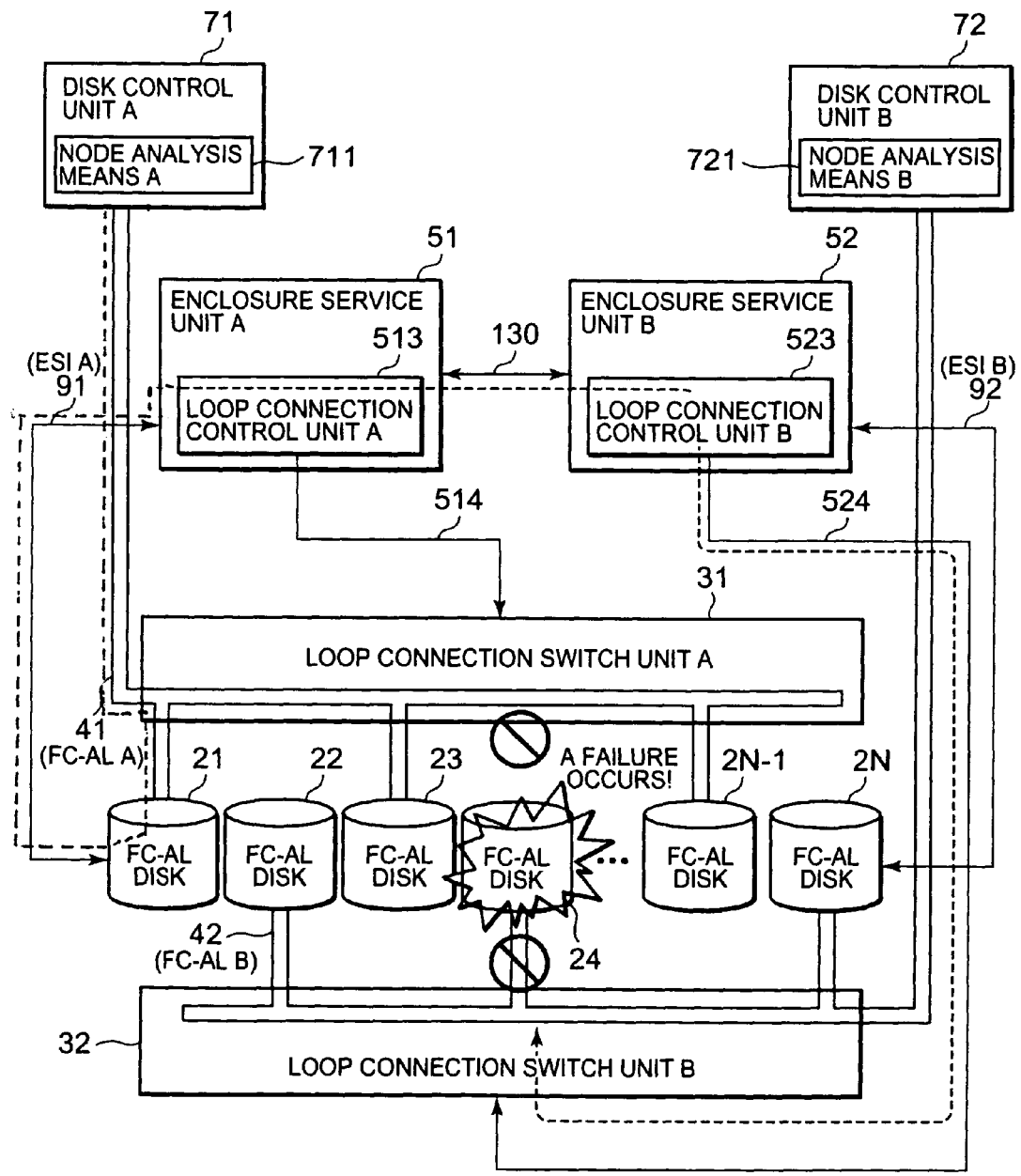
FIG. 3 shows an exemplary explanatory diagram showing exemplary operations at the time of occurrence of exemplary failures.

One exemplary embodiment of the present invention will be explained with reference to FIGS. 1 through 3. FIG. 1 is an exemplary block diagram showing an exemplary configuration of the present invention. FIGS. 2 and 3 are exemplary explanatory diagrams showing operations at the time of occurrence of failures. Hereinbelow, loop A components labels are discussed as "Ax" and loop B components labels are discussed as "Bx".

FIG. 1 shows an exemplary partial configuration of the disk array apparatus. The disk array apparatus shown in this exemplary figure may include plural node devices (e.g., FC-AL disks 21 . . . 2N), and may be connected to looped interface (e.g., two looped interfaces A41, B42, forming a duplex). Hereinbelow, two looped interfaces A41, B42 will be described as an example. Each of loop systems A, B may include respective controllers, (e.g., disk control units A71, B72), and enclosure service device (e.g., enclosure service units A51, B52), and loop connection switch units A31, B32, for example.

Enclosure service units A51, B52 are mutually interconnected by path 130 creating such a configuration that looped status may be monitored by each other. For example, in enclosure service units A51, B52, loop connection control units A31, B32 are installed to control disconnection and connection of disk 21-2N from the looped interface 41, 42 (FC-AL), which are connected to loop connection switch units A31, B32 via paths 514 and 524. For example, the aforementioned disk control units A71, B72 installed in each loop system A, B may be control units executing disk control, as will be mentioned later, which may generate control commands to enclosure service units 51 and 52 via specific disks.

Enclosure service units A51, B52 of the present invention may be connected to respective different disks 21-2N, for example. In this case, the disconnection/connection control commands are transmitted from disk control units A71, B72.

For example, the control commands from disk control units A71, B72 are transmitted to enclosure service units A51, B52 by the ESI A91 and ESI B92 through disk 21 and the like connected via the FC. The transmitted control commands are passed from enclosure service units A51, B52 through paths 514 and 524 to be informed to respective loop connection switch units A31, B32 to execute disk disconnection and connection.

In this example, it is configured such that enclosure service unit A51 in the loop A system (ESI controller SES) is connected to an odd-numbered disk and enclosure service unit B51 in the loop B system (ESI controller SES) is connected to an even-numbered disk.

Disk control units A71, B72 may include such a function that if a failure occurs in disk 21 and the like, a disk may be allocated to an enclosure service unit (e.g., plural disks are allocated to each of enclosure service units A51, B52) such that a specific disk may be included under the enclosure service unit (e.g., specific disks are included under each of enclosure service units A51, B52), and the disk may be connected to the corresponding enclosure service unit and the other disks are disconnected (e.g., the disks are connected to the corresponding enclosure service units and other disks (node disconnection control means) are disconnected).

In addition, for example, the controller (e.g., disk control units A71, B72) may have a node analyzer (e.g., a function to perform disk failure analysis (node analysis means A 711 and node analysis means B 721)) by disconnecting the disks by the aforementioned function to connect from the enclosure service unit (e.g., enclosure service units 51 and 52) in the recovered system (e.g., loop system) to the enclosure service unit (e.g., enclosure service units 51 and 52) in the other system (e.g., loop system).

In this case, the aforementioned function may not be always limited to be installed at disk control units A71, B72, and may be installed in the other upper ranking host systems (not shown). Also these functions may be implemented by a specific program incorporated in disk control units A71, B72.

Figure 4:
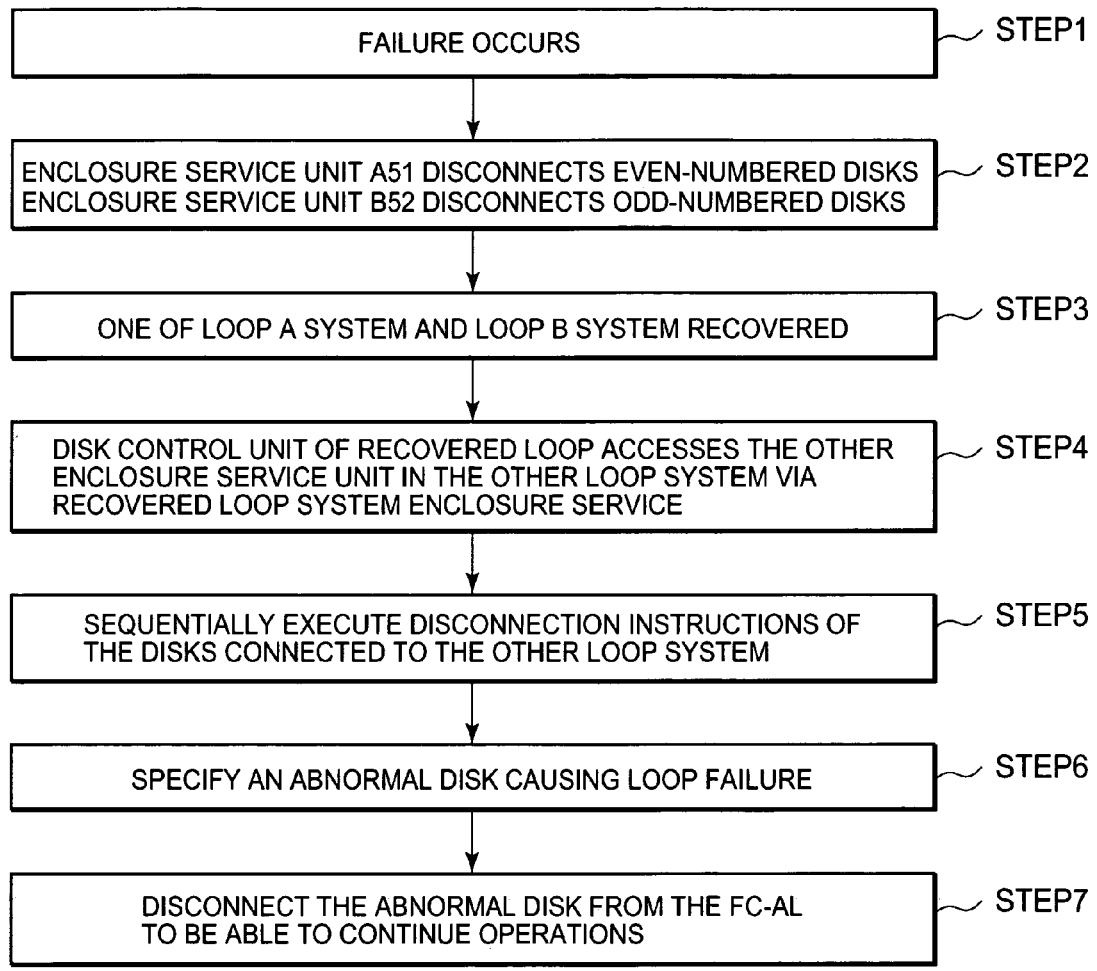
FIG. 4 shows an exemplary flowchart showing an exemplary operation of the present invention.
Figure 5:
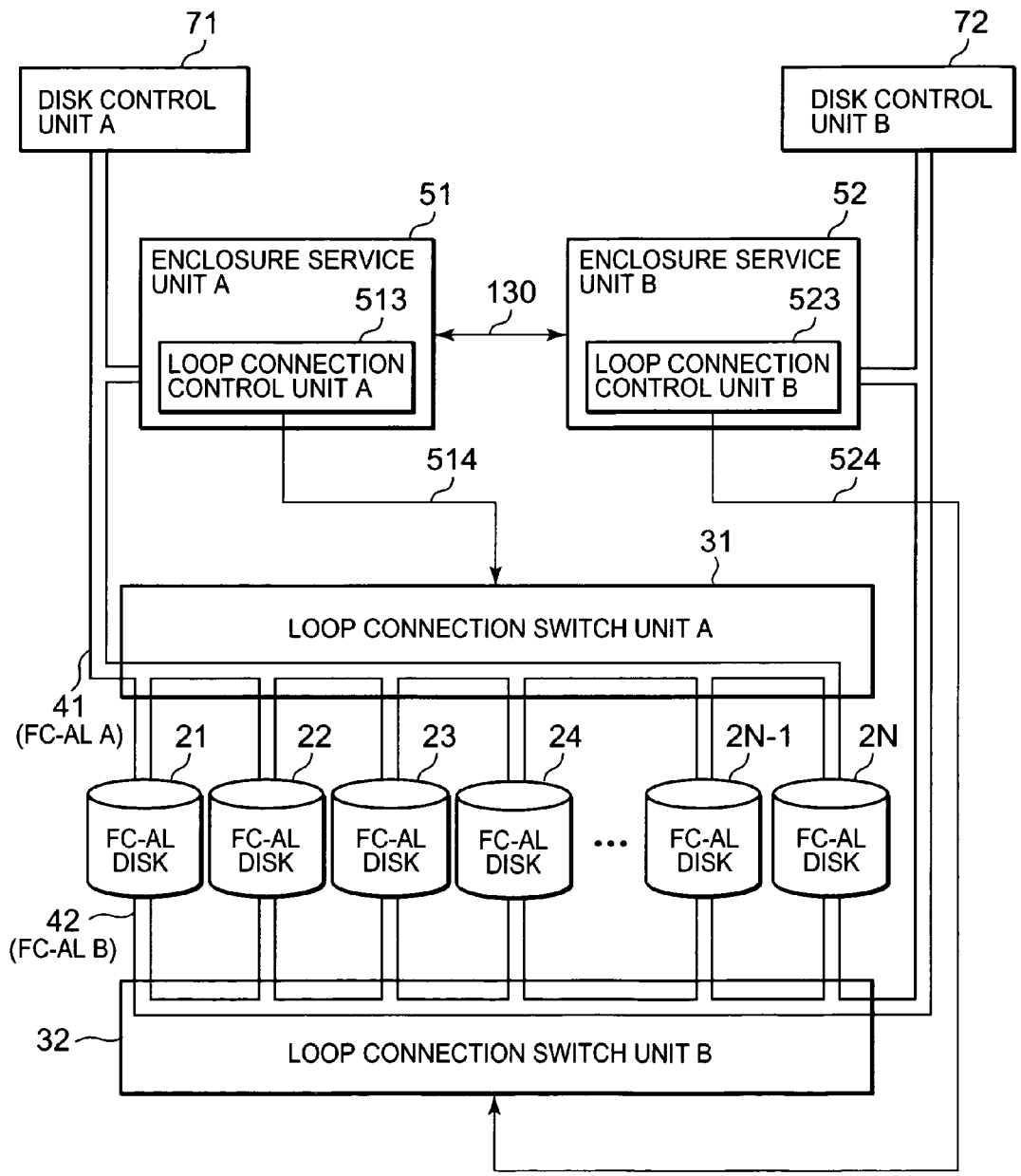
FIG. 5 shows an exemplary block diagram showing an exemplary configuration of the conventional disk array apparatus.
Figure 6:
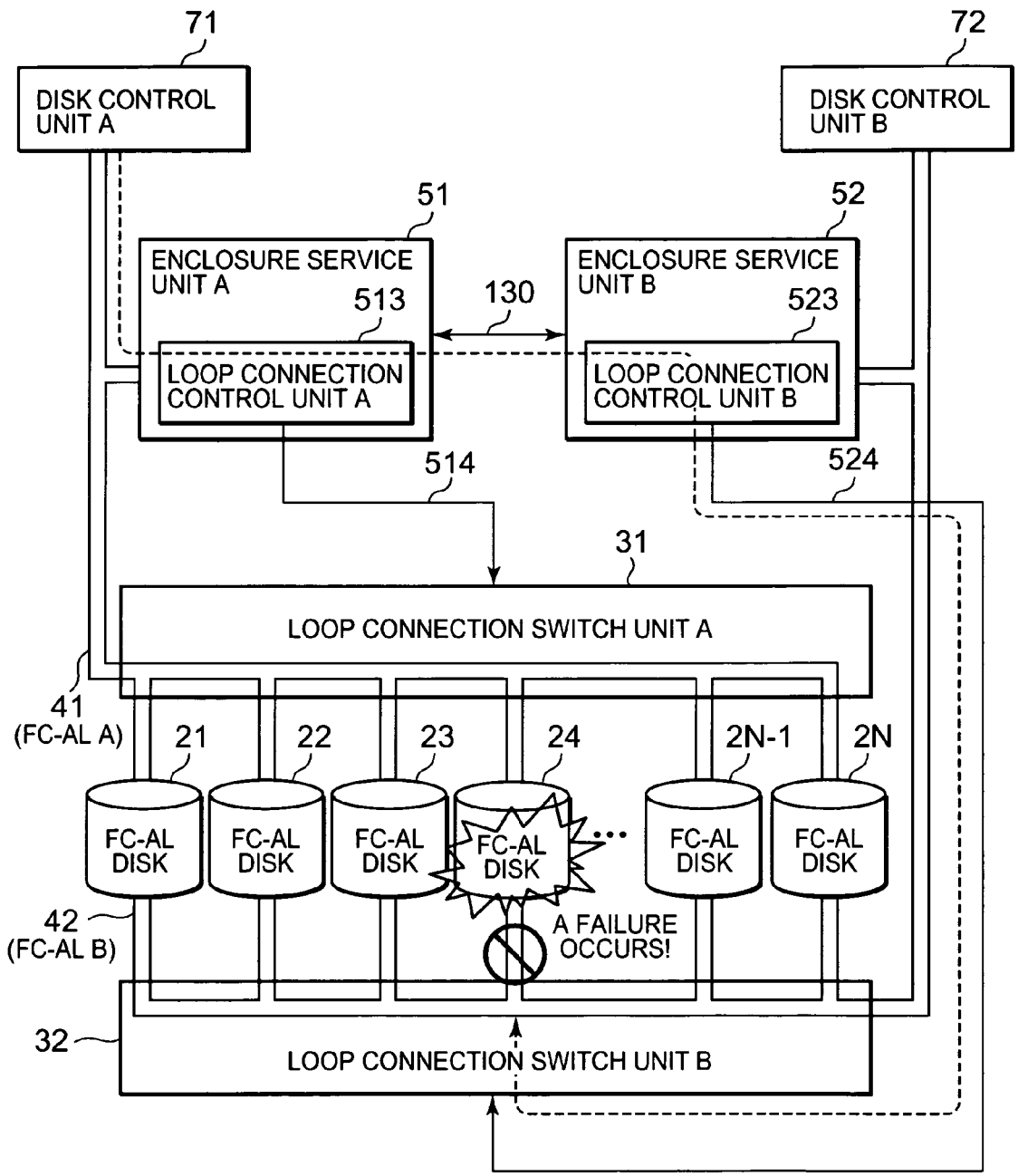
FIG. 6 shows an exemplary explanatory diagram showing exemplary operations at the time of occurrence of exemplary failures in the conventional apparatus shown in FIG. 5.
Figure 7:
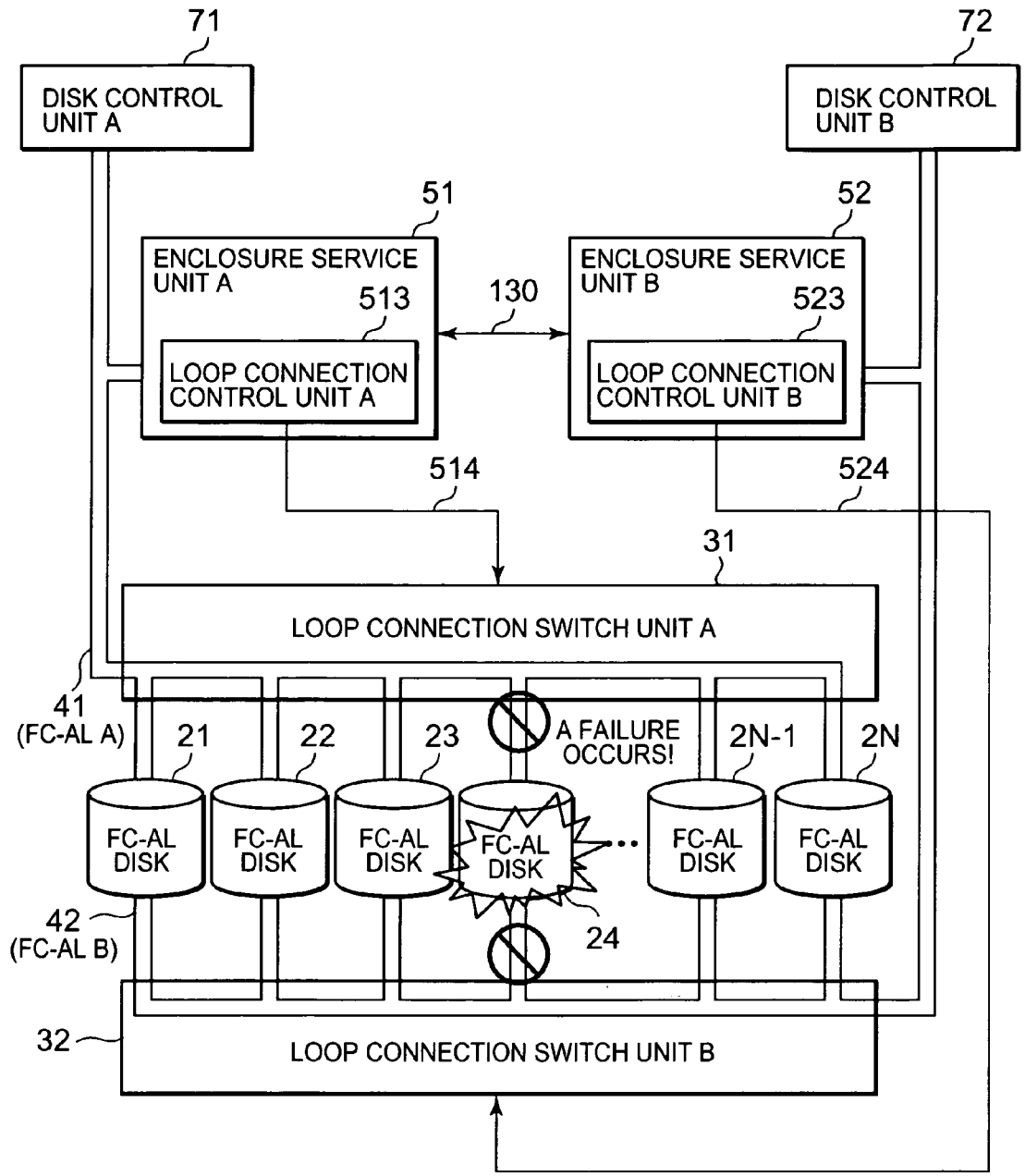
FIG. 7 shows an exemplary explanatory diagram showing an exemplary mode at the time of occurrence of failures in the conventional apparatus shown in FIG. 5.
Figure 8:
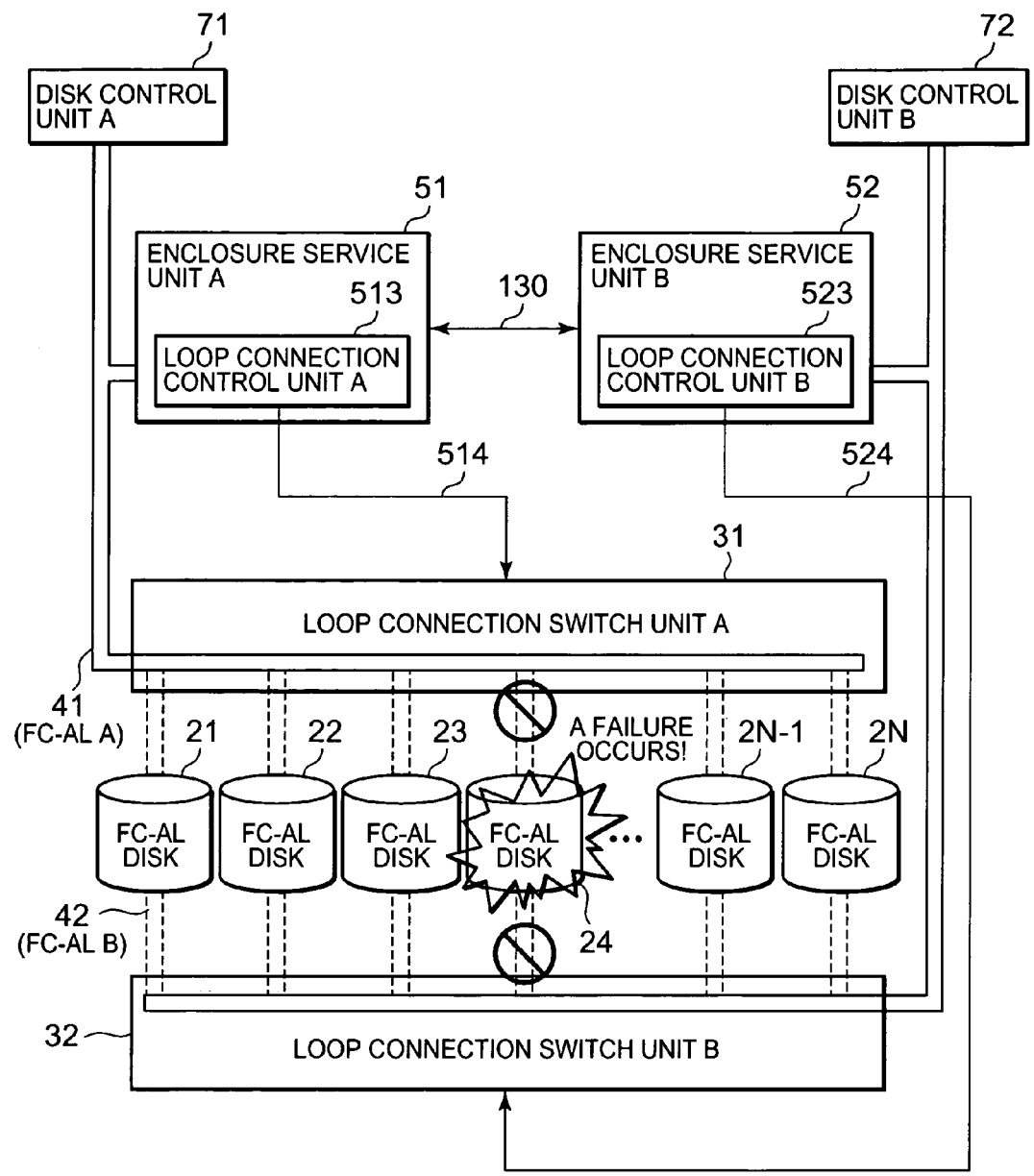
FIG. 8 shows an exemplary explanatory diagram showing exemplary operations at the time of occurrence of exemplary failures in the conventional apparatus shown in FIG. 5.
Figure 9:
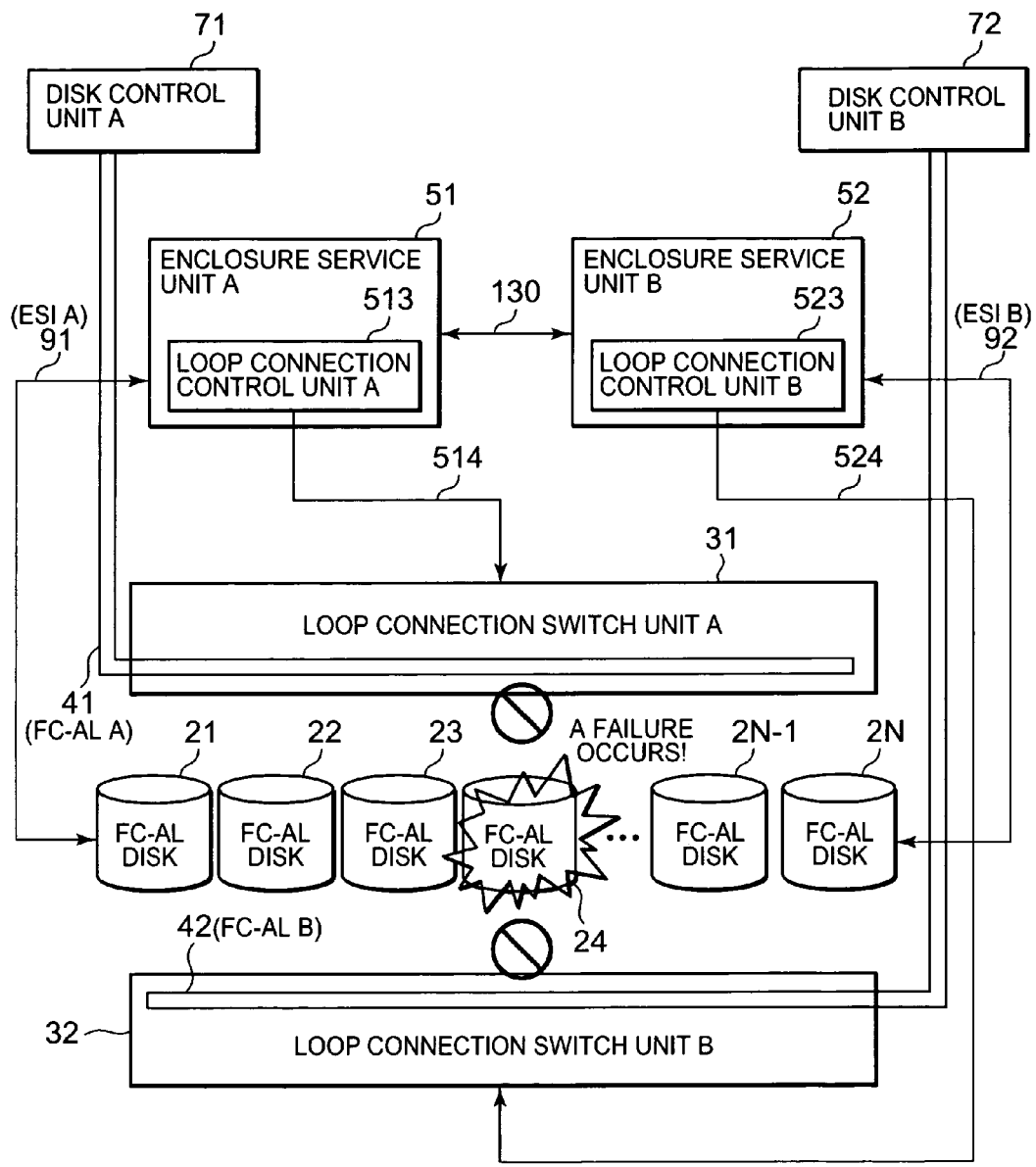
FIG. 9 shows an exemplary explanatory diagram showing an exemplary mode at the time of occurrence of exemplary failures in a second exemplary conventional apparatus.

The operations of the examples of the present invention will be explained with reference to FIGS. 2, 3, and 4. As shown in the figs, for example, assume that failures occur in both systems A, B of the FC-AL disk 24 (Step 1 in FIG. 4). The occurrence of failures may be detected by monitoring (e.g., constantly monitoring) in the control devices, such as disk control units A71, B72 in the disk array apparatus.

If such an incident occurs, for example, enclosure service unit A51 in loop system A disconnects even-numbered disks 22, 24 and 2N, while the enclosure service unit B52 in loop system B disconnects odd-numbered disks 21, 23, 2N-1 (Step 2). That is, in the enclosure service units A51, B52, respectively, in each loop system, for example, disks may be allocated half in loop system A and half in loop system B including respective disk 21 and 2N connected under enclosure service unit A51, B52 to maintain connections with these disks and connections to other disks are disconnected.

In this exemplary embodiment enclosure service unit A51 maintains connection with odd-numbered disks 21, 23 and 2N-1, enclosure service unit B52 maintains connection with even-numbered disks 22, 24 and 2N. Instead of these, it may be adopted that enclosure service unit A51 and enclosure service unit B52 disconnects all disks 21-2N, and subsequently, enclosure service unit A51 re-connects with odd-numbered disks 21, 23 and 2N-1, enclosure service unit B52 re-connects with even-numbered disks 22, 24 and 2N.

The status of connection of disks 21 and the like in each loop system is as shown in FIG. 3, for example. In this case, disk 24 showing the occurrence of a failure, may be connected to loop B system, while odd-numbered disks without the occurrence of failures are connected in loop A system. Therefore, loop A may be recovered (Step 3). Therefore, disk control unit A71 in recovered loop A system may access enclosure service unit A51 in loop A system via the recovered loop.

Subsequently, for example, disk control unit A71 may access the other enclosure service unit B52 in the other loop B system via path 130 via access enabled enclosure service A51 of loop system A (Step 4), and sequentially execute disconnection instructions of the disks connected in loop system B (See dotted line in FIG. 3) (Step 5). As a result, for example, disk 24 causing loop failure can be identified (Step 6) and an abnormal disk can be disconnected from the FC-AL, to be able to continue operations (Step 7).

In FIG. 3, to simplify the explanation, the dotted line is made from disk control unit A71 to loop connection switch unit B32 via enclosure service unit A51, path 130, and enclosure service unit B52. As evident to one of ordinary skill in the art, disk control unit A71 accesses the other enclosure service unit B52 via FC-AL A42, loop connection switch unit A31, FC-AL disk 21, ESI A91, enclosure service unit A51, and path 130. One exemplary advantage of the present invention is that the controller may access enclosure service unit, in a looped interface that includes the controller and the enclosure service unit under a node device connected to the looped interface even if a failure occur, for example.

This may be because a failure analysis system may include a controller A (e.g., disk control unit A 71) that sends a control command A, a looped interface A (e.g., FC-AL A 41), the controller A (e.g., disk control unit A 71) being selectively connectable to the looped interface A (e.g., FC-AL A 41), a node device A (e.g., FC-AL disk 21) that is selectively connectable to the looped interface A (e.g., FC-AL A 41), a node device B (e.g., FC-AL B 24) that is selectively connectable to the looped interface A (e.g., FC-AL A 41), and an enclosure service device A (e.g., enclosure service unit A) that receives the control command A via the node device A (e.g., FC-AL A 41).

If a failure occurs, the enclosure service device of A (e.g., enclosure service unit 51) disconnects the node device of B (e.g., FC-AL disk 24) from the looped interface of A (e.g., FC-AL A 41) and either maintains the node device of A (e.g., FC-AL A 41) connected to the looped interface A (e.g., FC-AL A 41), or disconnects and subsequently re-connects the node device of A (e.g., FC-AL A 41) to the looped interface A (e.g., FC-AL A 41).

Failure analysis can then be executed so that reliability of such system may be improved. This is an excellent effect compared to the conventional system, even though a failure might occur in all loop systems, since the present invention functions with the configuration, in a system connected to an enclosure unit having multiplexed FC-AL (Fiber-channel Arbitrated Loop) each having an ESI (Enclosure Service Interface) controller SES (SCSI Enclosure Service).

One exemplary advantage is that, in contrast to the conventional failure analysis method where disks are disconnected at once that may be only used when controller (e.g., host) directly accesses the enclosure service units (e.g., FC-Direct attached SES), the method of this exemplary embodiment may be executed for failure analysis in either of the configuration in which controller (e.g., host) directly accesses the enclosure service units (e.g., FC-Direct attached SES) or the configuration in which an enclosure service unit under a node device connected to the looped interface accepts a command from via the node device (e.g., an ESI (Enclosure Service Interface) controller SES).

In other words, if a failure occurs, plural node devices are allocated to each enclosure service unit such that each enclosure service unit contains a specific node device that is connected so that other node devices are disconnected. Subsequently, in each loop system after being disconnected, node devices which are still connected to enclosure service units may be included so that the loop system not including the node devices where a failure occurred is recovered. Therefore, it connects to other enclosure service unit via the enclosure service unit in this recovered loop system to access the other loop system to perform failure analysis of the node device.

For example, the method of this invention enables to execute failure analysis, when SES is either in the case of Direct attached SES or in the case of ESI controller SES.

One exemplary advantage is that, in contrast to the fact that all the disks may be disconnected from FC-AL and then sequentially connected according to the conventional method, according to the exemplary embodiment of the present invention, only half of the disks in each system may be disconnected from FC-AL, so that a time to specify an abnormal disk can be shortened.

In the above-mentioned explanation, for example, the SESs were separated by connecting to even-numbered disks and odd-numbered disks, but the present invention is not limited by such uniform allocation. For example, in the case of further multiplexing, respective different disks may be connected to each enclosure service unit in the respective loop system, and if a loop failure occurs, disks including those connected to an SES may be allocated to disconnect other disks.

For example, the present invention can be exemplarily incorporated in a disk array apparatus where plural disks are connected to the looped interface to be used for failure analysis, so that it has a potential to be used in industry.

While this invention has been described with reference to exemplary embodiments, this description is not intended as limiting. Various modifications of the illustrative embodiments, as well as other embodiments of the invention, will be apparent to persons skilled in the art, upon taking description as a whole. It is, therefore, contemplated that the appended claims will cover any such modifications or embodiments as fall within the true scope of the invention.

Further, the inventor's intent is to encompass all equivalents of all the elements of the claimed invention even if the claims are amended during prosecution.

This application is based on Japanese Patent Application No. 2005-099769 filed on Mar. 30, 2005 and including specification, claims, drawings and summary. The disclosure of the above Japanese Patent Application is incorporated herein by reference in its entirety.

What is claimed is:

1. A failure analysis system, comprising:
   a controller A that sends a control command A;
   a looped interface A, said controller A being selectively connectable to said looped interface A;
   a looped interface B;
   a plurality of node devices A that are selectively connectable to said looped interface A, said node devices A comprising a disk device;
   a plurality of node devices B that are selectively connectable to said looped interface A, said node devices B comprising a disk device;
   a controller B that sends a control command B, said controller B being selectively connectable to said looped interface B; and
   an enclosure service device A that receives said control command A via said node devices A and an Enclosure Service Interface (ESI),
   wherein said node devices A and B are mutually exclusively connected to said controllers A and B, respectively, and
   wherein:
   if a failure occurs in both the looped interfaces A and B, said enclosure service device A:
      selectively disconnects less than all of said node devices B from said looped interface A; and
      one of:
         maintains said node devices A connected to said looped interface A; and
         disconnects and subsequently re-connects said node devices A to said looped interface A.

2. The failure analysis system according to claim 1, further comprising:
   an enclosure service device B that is selectively connectable to said enclosure service device A and said node devices B.

3. The failure analysis system according to claim 2, wherein said node devices A is selectively connectable to said looped interface B and said node devices B is selectively connectable to said looped interface B, and
   wherein said enclosure service device B receives said control command B via said node devices B.

4. The failure analysis system according to claim 2, wherein said controller A includes:
a node analyzer that performs failure analysis of a node device connected to said looped interface B by accessing via said enclosure service device A and said enclosure service device B.

5. The failure analysis system according to claim 4, wherein said node device connected to said looped interface B includes said node devices B.

6. The failure analysis system according to claim 4, wherein:
said node device connected to said looped interface B includes said plurality of node devices B; and
said node analyzer identifies a node device that causes a failure.

7. The failure analysis system according to claim 1, wherein, if a failure occurs, each node device of said plurality of node devices A and B is allocated in a predetermined manner to one of said looped interface A and said looped interface B, such that:
any node device allocated to said looped interface B is disconnected from said looped interface A; and
one of:
a node device allocated to said looped interface A is maintained to be connected to looped interface A; and
a node device allocated to said looped interface A is disconnected and subsequently re-connected to looped interface A.

8. The failure analysis system according to claim 7, further comprising:
a plurality of looped interfaces selectively connectable to said plurality of node devices A and B, said looped interface A and said looped interface B being included in said plurality of looped interfaces, wherein said plurality of node devices A and B are uniformly allocated among said plurality of looped interfaces, if a failure occurs.

9. The failure analysis system according to claim 7, wherein said looped interface A includes a loop connection switch device that switches between connection and disconnection of said plurality of node devices A and B.

10. A method for analyzing failure in a system, said system comprising:
a controller A that sends a control command A;
a looped interface A, said controller A being selectively connectable to said looped interface A;
a looped interface B;
a plurality of node devices A that are selectively connectable to said looped interface A, said node devices A comprising a disk device;
a plurality of node devices B that are selectively connectable to said looped interface A, said node devices B comprising a disk device;
an enclosure service device A that receives said control command A via said node devices A and an Enclosure Service Interface (ESI); and
a controller B that sends a control command B, said controller B being selectively connectable to said looped interface B,
wherein said node devices A and B are mutually exclusively connected to said controllers A and B, respectively, said method comprising:
if a failure occurs, in both the looped interfaces A and B:
selectively disconnecting less than all of said node devices B from said looped interface A; and
one of:
maintaining said node devices A connected to said looped interface A; and
disconnecting and subsequently re-connecting said node devices A to said looped interface A.

11. The method for analyzing failure according to claim 10, said plurality of node devices A and B that are selectively connectable to said looped interface A being numbered, said method further comprising:
disconnecting one of even-numbered and odd-numbered ones of said node devices A and B.

12. The method for analyzing failure according to claim 11, further comprising:
recovering said looped interface A.

13. The method for analyzing failure according to claim 11, said system further comprising:
an enclosure service device B that is selectively connectable to said enclosure device A and said node devices B, said method further comprising:
accessing from said controller A to said enclosure service device B via said enclosure service device A.

14. The method for analyzing failure according to claim 13, wherein said plurality of node devices A and B are selectively connectable to said looped interface B, said method further comprising:
sequentially disconnecting one of even-numbered and odd-numbered ones of said node devices A and B connected to said looped interface B.

15. The method for analyzing failure according to claim 14, further comprising:
specifying an abnormal node device causing said failure.

16. The method for analyzing failure according to claim 15, further comprising:
disconnecting said abnormal node device from said looped interface B.

17. A computer-readable storage medium embodying a program of machine-readable instructions executable by a digital processing apparatus, said program causing a failure analysis system to perform a method of claim 11.

18. A failure analysis system, comprising:
a controller A that sends a control command A;
a looped interface A, said controller A being selectively connectable to said looped interface A;
a looped interface B;
a node device A that is selectively connectable to said looped interface A and said looped interface B, said node device A comprising a disk device;
a node device B that is selectively connectable to said looped interface A and said looped interface B, said node device B comprising a disk device;
an enclosure service device A that receives said control command A via said node device A and an Enclosure Service Interface (ESI);
an enclosure service device B; and
a controller B that sends a control command B, said controller B being selectively connectable to said looped interface B,
wherein said node devices A and B are mutually exclusively connected to said controllers A and B, respectively, and
wherein:
said node device A is connected to the looped interfaces A and B, and said node device B is connected to the looped interfaces A and B;
said node device A is allocated to said enclosure service device A, and said node device B is allocated to said enclosure service device B, respectively;
if a failure occurs, said enclosure service device A;
disconnects said node device B from said looped interface A; and one of:
- maintains said node device A connected to said looped interface A; and
- disconnects and subsequently re-connects said node device A to said looped interface A, said enclosure service device B:
- disconnects said node device A from said looped interface B; and one of:
- maintains said node device B connected to said looped interface B; and
- disconnects and subsequently re-connects said node device B to said looped interface B.

19. A method for analyzing a failure in a system, comprising:
- a controller A that sends a control command A;
- a looped interface A, said controller A being selectively connectable to said looped interface A;
- a looped interface B;
- a node device A that is selectively connectable to said looped interface A and said looped interface B, said node device A comprising a disk device;
- a node device B that is selectively connectable to said looped interface A and said looped interface B, said node device B comprising a disk device;
- an enclosure service device A that receives said control command A via said node device A and an Enclosure Service Interface (ESI);
- an enclosure service device B; and
- a controller B that sends a control command B, said controller B being selectively connectable to said looped interface B, wherein said node devices A and B are mutually exclusively connected to said controllers A and B, respectively, and wherein:
- said node device A is connected to the looped interfaces A and B, and said node device B is connected to the looped interfaces A and B;
- said node device A is allocated to said enclosure service device A and said node device B is allocated to said enclosure service device B, respectively;
- if a failure occurs, said enclosure service device A:
  - disconnects said node device B from said looped interface A; and
  - one of
    - maintains said node device A connected to said looped interface A; and
    - disconnects and subsequently re-connects said node device A to said looped interface A,
- said enclosure service device B:
  - disconnects said node device A from said looped interface B; and
  - one of:
    - maintains said node device B connected to said looped interface B; and
    - disconnects and subsequently re-connects said node device B to said looped interface B.

20. The failure analysis system according to claim 1, wherein said node devices A and B are mutually exclusively connected to the looped interface A or the looped interface B, when a dual failure occurs.

21. The failure analysis system according to claim 18, wherein said node devices A and B are mutually exclusively connected to the looped interface A or the looped interface B, when a dual failure occurs.

* * * * *